United States Patent [19]

Smith et al.

[11] 4,348,418

[45] Sep. 7, 1982

[54] SIMULATED FOOD PRODUCT AND METHOD OF MANUFACTURE THEREFOR

[75] Inventors: John R. Smith, Maidenhead; Gerhard O. J. Fischer, Gerrards Cross, both of England

[73] Assignee: Quaker Oats Limited, Southall, England

[21] Appl. No.: 172,077

[22] Filed: Jul. 24, 1980

[30] Foreign Application Priority Data

Aug. 1, 1979 [GB] United Kingdom ............... 7926739
Sep. 19, 1979 [GB] United Kingdom ............... 7932490

[51] Int. Cl.³ ............................................. A23L 1/04
[52] U.S. Cl. .................................. 426/104; 426/573; 426/575; 426/577; 426/802; 426/803; 426/805; 426/646; 426/574
[58] Field of Search ............... 426/573, 575, 577, 102, 426/103, 104, 802, 803, 805, 646, 574

[56] References Cited

U.S. PATENT DOCUMENTS

| | | | |
|---|---|---|---|
| 2,992,925 | 7/1961 | Green et al. .................... | 426/102 |
| 3,362,831 | 1/1968 | Szczesniak ....................... | 426/575 |
| 3,892,870 | 7/1975 | Wood ................................ | 426/575 |
| 4,117,172 | 9/1978 | Bradshaw et al. ............... | 426/573 |
| 4,143,171 | 3/1979 | Buckley et al. ................. | 426/805 |
| 4,163,805 | 8/1979 | Mueller ............................ | 426/575 |

*Primary Examiner*—Jeanette M. Hunter
*Attorney, Agent, or Firm*—Louis E. Marn; Elliot M. Olstein

[57] ABSTRACT

Simulated food products in the form of discrete shape-retaining pieces having a calcium alginate gel matrix, and in particular simulated meat petfoods, are made from a mixture produced by mixing (a) an aqueous slurry comprising a comminuted food material and having a water-soluble alginate salt dissolved therein, with (b) a slurry, usually aqueous, of a calcium salt sparingly soluble in water having a monohydric or polyhydric alcohol or a sugar comprised therein as a retardant; and thereafter allowing the mixture to gel.

The alcohol may be isopropyl alcohol, glycerol, propylene glycol or butylene glycol. Corn syrup, sucrose or a mixture of sugars may be used as the sugar.

14 Claims, No Drawings

SIMULATED FOOD PRODUCT AND METHOD OF MANUFACTURE THEREFOR

This invention relates to a food product for consumption by humans or domestic pet animals, and to a method for its manufacture.

In particular, it relates to the production of simulated meats, fish, fruits or vegetables in the form of discrete shaped pieces for use in canned or frozen meat products, petfoods, jams, confections or desserts. It is also to be understood that the product of this invention has many other possible uses and its use is not restricted to such products as previously mentioned, nor to its sale in a canned or frozen form.

Over the years, numerous attempts have been made to produce shape-retaining simulated food products having a matrix composed of gelled calcium alginate or other divalent metal alginate. One aspect of this technique is to make possible the re-formation of meat-like pieces from meat wastes which have been comminuted. In general, two alternative approaches have been adopted.

In the first approach, a mix is so formed into subdivided units and each is provided with a skin. This is typified by U.K. Patent Specification No. 1,474,629, in which an aqueous mixture containing finely-divided food material e.g. meat and a soluble alginate salt is formed into pieces to simulate meat. These pieces are then treated with a solution containing calcium ions. This forms a gelled calcium alginate skin around each piece to encapsulate it and help retain its shape.

A variation of this method, also described in U.K. Patent Specification No. 1,474,629, involves the incorporation of a water-insoluble calcium salt into the alginate-containing meat mix. When this mixture is surface-treated with edible acid it releases calcium at the surface and again forms a skin around the product.

In practice the methods described in No. 1,474,629 result in the production of simulated meat pieces having a soft and sticky interior. Moreover, the food pieces so obtained are rounded in shape. They do not closely resemble cut pieces of meat or offal. Also, to get encapsulate pieces of sufficient strength to withstand subsequent processing and handling, long contact times between the calcium salt solution and the original pieces are required. Such long contact times are not well suited to continuous industrial processing.

Another related method of making shape-retaining pieces of foodstuff is described in U.K. Patent Specification Nos. 1,484,563 and 1,302,275. In this, a soluble calcium salt is mixed with a food product such as fruit pulp. Drops of the mixture are then contacted with a water-soluble alginate solution so as to produce artificial fruits with a pulpy centre and a gel skin. However, the problems of long contact time previously mentioned are not overcome.

In the second approach to the manufacture of simulated food products based on an alginate gel matrix all of the components are mixed together to provide subdivided units gelled throughout their thickness. Typically, both a source of calcium ions and a watersoluble derivative of alginic acid are mixed with a comminuted food material. This is generally carried out in the presence of a retarding agent, in order to prevent instantaneous reaction between the calcium and the alginate.

Many "instant" pudding mixes are of this type, but a more pertinent example of this second approach for the purposes of the present invention is afforded by U.K. Patent Specification No. 1,302,432. In this there is described the manufacture of a simulated adipose tissue, by reacting together (a) an aqueous solution of an alkali metal salt of alginic acid and (b) an alkaline earth metal salt in the presence of fat and a retarding agent.

Substances typically described in the literature for use as retarding agents in this second approach are salts of phosphoric acids, ethylenediamine tetra acetic acid, or salts of citric acid.

Known retarding agents, however, often lead to the production of gels of unsuitable quality, or provide long and/or variable gelation times. They may also introduce into the food an adverse flavour depending upon the retarding agent employed.

The invention sets out to provide a suitable and continuous industrial method for the manufacture of simulated food products based on an alginate gel matrix. Initially, "rapid mixing" of sparingly-soluble calcium salts alone, into an alginate containing, aqueous, homogenous food slurry was investigated. Although some success can be obtained in making simulated foods gelled with calcium alginate in this way, gelation generally occurs in inconveniently short times for continuous industrial production and an improved method for prolonging the gelation time is desirable.

It has now been discovered according to the invention that firm cutable foods may be formed using a sugar or a polyhydric or monohydric alcohol or combination thereof as retarding agents, as defined below. Such retarding agents used according to the method of the invention give a useful interval for working the food mass before setting occurs. Also the time after which the system sets to a cutable alginate gel matrix is relatively constant for a given food mixture; thus the system lends itself to continuous industrial production.

The invention accordingly consists in a method of forming a food product in the form of shape-retaining pieces which comprises the essential steps of:

(a) producing an aqueous slurry of comminuted food material having a water-soluble alginate salt dissolved therein, (b) producing a slurry of a sparingly water-soluble calcium salt, the slurry additionally comprising, as a retarding agent, a sugar or monohydric or polyhydric alcohol, (c) mixing the two slurries together, (d) allowing the mixture to gel.

The invention involves along with the sparingly water-soluble calcium salt the combination of two further features, neither of which is conventional in this art, namely the use as retarding agent of a class of substances not hitherto selected for this purpose; and the use of a method in which two slurries are mixed, the calcium salt and retardant being present in the same slurry prior to such mixing.

The Applicants do not intend to be limited by any theory regarding the mode of operation of the method of the invention as described above. However, it appears possible that, from the chemical point of view the sugar or alcohol weakly complexes the calcium ions arriving in the aqueous mixed slurries from the sparingly soluble calcium salt and so reduces the rate of reaction with the water-soluble alginate salt. From a manipulative point of view if appears that, during the mixing period of the two slurries any transient local overconcentrations of calcium salt are necessarily matched by suitable transient local concentrations of retardant, since both are incorporated as a slurried mixture and partake of the same distribution of short-term inhomogenieties during the brief period before mixing is complete. Whatever the reasons, however an acceptable uniform and reproducible product can be obtained on a continuous basis. On the other hand, without the use of a retarding agent, the reaction between the calcium ions arriving in solution, and the sodium alginate is very rapid and the progress of gelation is accompanied by a rise in the viscosity of the mixture (as measured by the electric current taken by a mixer mixing the mass). This gel that forms is broken up during the further mixing required to achieve a homogeneous end product and the finished mix forms a weakly structured or unstructured product.

With the appropriate quantity of retarding agent present and using the method described above, mixing to homogeneity results, with no loss of the gelling properties of the finished mixture.

In the above definition of the invention, the term "sugar" is intended to cover any mono-, di- higher oligosaccharide based on furanose and/or pyranose ring systems. In practice sucrose, glucose and fructose are preferred, although maltose and lactose are possible. It is additionally intended to cover such materials not only in chemically pure form but also in the standard grades of available materials e.g. the various types of sucrose. In particular, the invention lends itself to the use of liquid sugar materials, such as the glucose syrups made by hydrolysis of cereal grains. Mixtures of sugars may also be used.

The term "monohydric or polyhydric alcohol" is intended to cover any organoleptically acceptable organic hydroxy-compound of a predominantly alcholic function, e.g. straight or branched chain mono-alkanols, such as ethanol, isopropanol, diols such as propylene or butylene glycol or triols such as glycerol. When polyhydric they can be of mixed type e.g. with primary and secondary —OH groups such as glycerol. They should be suitably compatible with water, since they must be mixed into the aqueous slurry of comminuted foodstuff. Although usually based on straight or branched alkyl chains, they can also be carbocylic, alicyclic, heterocyclic, or aromatic provided that they are otherwise acceptable in the foodstuff. They can either be associated with a proportion of water, or be used as waterfree liquids, to provide the liquid phase for the slurry of calcium salt.

The above retarding agents, especially the sugars, do not give an adverse taste to the food.

A suitable retardant vehicle for the calcium salt slurry is an aqueous solution e.g. a solution containing at least 50% of the retardant. Usually, the calcium salt slurry will be used in amounts less than that of the comminuted product slurry, e.g. from 1 to 50% preferably 2-10% by volume.

Generally, the water soluble alginate derivative will be present in the mixture, to give an amount of 0.3 to 5% by weight of alginate in the final product. The preferred water soluble alginate is sodium alginate. Calcium sulphate is the preferred sparingly soluble calcium salt and its preferred proportion is at least 0.5% by weight in the finished product.

It will be appreciated that a "comminuted" foodstuff can be present in any acceptable degree of subdivision, since the alginate gel provides the essential structure. Chopped or sliced meats or vegetables, chipped, grated or minced foodstuffs, mashed, pureed or pulped products can all be utilised, optionally together with flavouring materials whether solid or liquid.

Thus, in principle most food products in comminuted form may be used in the mixture. For simulated meat chunks a proteinaceous material may be used and fat addition may be made. The proteinaceous material used to prepare simulated meats for use in petfoods is usually ground offal on account of its low cost. Simulated fruit products may be produced by employing fruit pulp or even a completely artificial fruit flavoured material.

Preferred mixing equipment comprises an impeller pump capable of being driven at high speed e.g. (3000 revolutions per minute) which has been modified to act as a stirrer for the mixture pumped therethrough by another pump. By using such equipment short mixing times of less than 30 seconds may be achieved in a continuous system.

The homogenous mixture (comminuted food, alginate, calcium salt and sugar or alcohol retarding agent) pumped out of this mixer can be discharged onto a conveyor or cast in moulds. It subsequently sets to a firm gelled mass: depending on the particular composition, gelation may be substantially complete within a time of a few seconds up to five minutes.

The food product may be cast into the desired final shape before gelling is completed or the gelled food product may be cut into the required shape after a suitable proportion of gelling has taken place, i.e. after partial or complete gelation.

In continuous production this is conveniently effected by allowing the material to flow on to a conveyor belt where it spreads out and gels as a flat strip which is then passed to e.g. a dicing machine.

This mode of operation can be elaborated to provide a further feature of the invention, in which a plurality of supplies of mixed slurries as above, prior to gelation, are fed successively on to the same moving conveyor belt, at locations spaced so that each layer has gelled before the next supply of mixed slurries is fed, whereby a multilayer deposit of gelled material is produced. optionally of different compositions in each layer.

We have found surprisingly that the gelled layers do not mutually adhere, so that passage through the same dicing machine as described above produces separate dice of gelled product and optionally in any desired proportion of different products diced. Thus, a high level of product ion can be obtained from a single conveyor installation.

The re-formed simulated food pieces thus obtained which comprised a uniformly distributed calcium alginate gel matrix are stable to normal industrial freezing and canning processes and may be sold in such form with or without admixture with other food materials.

A particular advantage of the process is that it may be carried out at room temperature without the need for expensive heating apparatus.

The invention is illustrated in the following examples, which are given only by way of exemplification and are not to be considered as limiting. All the percentages shown are on a weight basis.

EXAMPLE 1

A mixture of meat offals and by-products containing
Beef Trimmings: 20%
Wet Greaves: 20%
Chicken Intestines: 10%
Fresh Whole Blood: 10%
Ground Bone: 10%

Liver: 10%
Beef Gullets: 10%
Cooked Chicken Residue: 10%
was finely ground through a 3 m.m. plate.

This mixture was taken at approximately 20° C. and mixed with a solution of sodium alginate (Manugel GHB-Alginate Ind. Ltd) to give a slurry having the composition:
Ground Meat Mixture (as above): 55%
Sodium Alginate: 1.5%
Water: 43.5%

A suspension of calcium sulphate (superfine grade) in a sugar solution having the following composition was then made:
Calcium Sulphate: 12%
Sucrose: 43%
Guar Gum: 0.8%
Liquid Caramel: 0.99%
Erythrosine: 0.01%
Water: 43.2%

The meat/alginate mixture, 95%, was then mixed very rapidly with 5% of the calcium sulphate suspension at 20° C. After mixing for 3 seconds, the mixture was discharged onto a belt conveyor where it set to a solid mass after one minute. The set material was cut into meat-like pieces after a further two minutes.

EXAMPLE 2

The method of Example 1 was performed except that the meat mixture was replaced by apple pulp.

The material set to a firm mass 20 seconds after the final mixing and discharge onto the belt conveyor.

EXAMPLE 3

Wet greaves (the residue after rendering of fat from fatty tissues) and meat meal were finely ground and the ground material mixed with an alginate solution to give a slurry of the following composition:
Meat Meal: 5%
Ground Wet Greaves: 45%
Sodium Alginate: 1.5%
Water: 48.5%

A suspension of calcium sulphate in a sugar solution was made as follows:
Calcium: 12%
Sucrose: 44%
Water: 44%

95% of the greaves/alginate/meat meal slurry was then rapidly mixed with 5% of the calcium sulphate/sugar suspension. After exit from the mixer, the mixed material set to a firm gel in 1 minute. The gel was then cut into pieces.

EXAMPLE 4

The method of Example 3 was followed except that the wet greaves was replaced by an equipart mixture of ground peas, carrots and potato.

EXAMPLE 5

The method of Example 1 was followed except that the mixture of meat offals and by product was replaced by minced fish offals.

The simulated meat, fish, fruit or vegetable pieces, or moulded shapes, made in accordance with the Examples given were canned and heat processed, or frozen, without disintegrating.

The canned or forzen products were fed to and accepted, as appropriate by pets or humans.

It will be appreciated that variations may be made to the specific preferred features described above without departing from the bread teaching of this invention. Such variations are intended to be within the scope of this invention.

We claim:
1. A method of forming a food product in the form of shape-retaining pieces which comprises the steps of:
   (a) producing an equeous slurry of comminuted food material having a water-soluble alginate salt dissolved therein,
   (b) producing a slurry of a sparingly water-soluble calcium salt including as a retarding agent a member selected from the group consisting of sugar, a monohydric alcohol and a polyhydric alcohol,
   (c) mixing the slurries of step (a) and (b) for a time period of less than 30 seconds,
   (d) allowing the resulting mixture of step (c) to gel; and
   (e) cutting into pieces the product of step (d), said water soluble alginate salt being present in an amount of from 0.3 to 5.0 percent by weight of said product.
2. The method according to claim 1, wherein the slurry of calcium salt comprises a mixture of sugars.
3. The method according to claim 1, wherein the slurry of calcium salt comprises a glucose syrup as the sugar content.
4. The method according to claim 1, wherein the monohydric alcohol is isopropyl alcohol.
5. The method according to claim 1, wherein the polyhydric alcohol is selected from glycerol, propylene glycol and butylene glycol.
6. The method according to claims 1, 2, 3 or 4 wherein the water-soluble alginate is sodium alginate.
7. The method according to claims 1, 2, 3 or 4 wherein the calcium salt is calcium sulphate.
8. The method according to claim 1, wherein the sparingly water-soluble calcium salt slurry is an aqueous slurry in which the liquid medium contains at least 50% by weight of the sugar or alcohol.
9. The method according to claim 1, wherein the slurry of sparingly water-soluble calcium salt has as its liquid phase a monohydric or polyhydric alcohol which is liquid at room temperature and contains no water.
10. The method according to claim 1, wherein the food material is a proteinaceous material.
11. The method as claimed in claim 1 in which subsequently to step (c) and prior to step (d) said resulting mixture is allowed to flow on to a moving conveyor or belt to thereby spread and gel in the form of a flat strip prior to being cut into pieces.
12. The method as claimed in claim 11 in which a plurality of resulting mixtures are successively deposited on to said moving conveyor belt at locations spaced so that each of said resulting mixtures has gelled before the next resulting mixture is deposited whereby a multilayer deposit of gelled material is produced.
13. The method as claimed in claim 12 wherein each layer of said multilayer deposit is of a different composition.
14. Simulated food pieces in the form of shape-retaining pieces comprising a uniformly distributed calcium alginate gel matrix, manufactured by reacting a sparingly soluble calcium salt suspended in an aqueous solution including a retarding agent selected from the group consisting of a sugar, polyhydric alcohol and monohydric alcohol together with a slurry of comminuted meaty materials containing an alginate derivative.

* * * * *